United States Patent [19]

Thomson

[11] 4,241,986
[45] Dec. 30, 1980

[54] FOLDING CAMERA

[75] Inventor: Kenneth W. Thomson, Rochester, N.Y.

[73] Assignee: Eastman Kodak Company, Rochester, N.Y.

[21] Appl. No.: 65,471

[22] Filed: Aug. 10, 1979

[51] Int. Cl.³ ............................................. G03B 17/04
[52] U.S. Cl. ........................................................ 354/193
[58] Field of Search ........................ 354/83–86, 354/187, 192–194, 288

[56] References Cited

U.S. PATENT DOCUMENTS

| D. 100,961 | 8/1936 | Mihalyi. | |
|---|---|---|---|
| 785,239 | 3/1905 | Thornton. | |
| 1,184,110 | 5/1916 | Linder. | |
| 1,851,095 | 3/1932 | Gosselin. | |
| 2,033,703 | 3/1936 | Green. | |
| 2,333,807 | 11/1943 | Mihalyi. | |
| 2,768,564 | 10/1956 | Land. | |
| 3,677,160 | 7/1972 | Harvey | 354/187 X |
| 3,693,526 | 9/1972 | Harvey. | |
| 3,906,521 | 9/1975 | Ueda | 354/86 |
| 4,074,296 | 2/1978 | Munakata et al. | 354/187 |
| 4,075,645 | 2/1978 | Munakata et al. | 354/187 |
| 4,104,662 | 8/1978 | Fukuda | 354/187 |

FOREIGN PATENT DOCUMENTS 24350 of 1902 United Kingdom.

OTHER PUBLICATIONS

Chironis, N. P., *Mechanisms, Linkages, & Mechanical Controls*, McGraw-Hill, N.Y., 1965, p. 155.

*Primary Examiner*—John Gonzales
*Attorney, Agent, or Firm*—N. Rushefsky

[57] ABSTRACT

An improved folding camera includes a housing for supporting photographic film, a lens assembly covering door and a lens assembly supporting member. Both the door and the member are pivotally coupled to the housing and a link rod is pivotally coupled to both the door and the member. The coupling between the link rod and the member comprises an overcenter joint. This joint assumes an approximately center position when the lens assembly covering door is raised from a home position to a temporary position and moves to either side of the center position in response to return movement of the door to its home position. The particular side of center to which the joint moves is determined by the orientation of the camera relative to gravity. Since the member moves in response to movement of the overcenter joint the member may be pivoted towards or away from the housing when the overcenter joint moves from its center position. The camera may thus be either erected or folded by the same rocking movement of the lens assembly covering door.

22 Claims, 9 Drawing Figures

FOLDING CAMERA

BACKGROUND OF THE INVENTION

1. Field of the Invention

The present invention relates to photography and more particularly to folding cameras.

2. Description of the Prior Art

In recent years, self-processing cameras have become very popular among amateur photographers. For reasons well known to those skilled in the photographic art, such cameras necessarily require large format film and dictate the use of relatively long focal length objective lenses in order to provide reasonably large finished prints. Accordingly, self-processing cameras are often of the folding type which was common among conventional cameras at the time when the formats of most amateur camera films were correspondingly large. The lens and shutter assembly of a typical known folding camera is carried by a lens-supporting board or member that is connected to the camera housing by a collapsible bellows and supported by a parallelogram linkage that maintains the lens in parallel relation to the housing. Alternatively, it is also known to support the lens at one end of a board that is hinged to the housing at its opposite end and provided with a collapsible bellows that allows the board to move between an open position in oblique relation to the housing and a closed position in which a surface of the board is located either fully flush with or approximately flush with the camera housing. Cameras of this latter type are described, for example, in U.S. Pat. Nos. 785,239; 2,880,658; 3,665,831; 3,677,160 and 3,693,526. The latter patent describes a folding camera that includes, in addition to the lens-supporting board, a door for covering the lens when the camera is in its folded state. In addition to protecting the lens, the lens-covering door also includes a latch for preventing the board from inadvertently moving out of its folded position. The camera may be erected by movement of the lens-covering door to an inoperative position wherein it remains while the board is moved to its erected position.

One problem requiring consideration in the design of folding cameras is that of alignment of the objective lens so that it is correctly positioned relative to the film plane when the camera is erected. To ensure this alignment, the camera must remain substantially rigid when erected so that forces applied by the user during an exposure will not alter the optical geometry of the camera. In addition to being rigid, the camera's erecting mechanisms must also position the lens at an appropriate distance from the film plane each time the camera is erected. To these ends the prior art, as exemplified by the aforesaid patents, suggests that a jointed strut be provided between the housing and the lens supporting board. In order to erect and fold these cameras the operator is obliged to grasp portions of the camera adjacent the lens or the bellows thereby creating an opportunity for either fingerprints being lodged on the lens or distortions being imparted to the bellows. Distortion to the bellows may be such as to move a portion of the bellows into the optical path between the lens and the film thereby blocking a portion of the periphery scene from being photographed. To preclude this, the bellows may be provided with rigid sections as suggested in the prior art but this entails additional expense.

SUMMARY OF THE INVENTION

It is therefore an object of my invention to provide a new and improved folding camera which permits the erecting and folding thereof without the need for manipulating areas of the camera adjacent the lens or touching the bellows.

As indicated previously, it is well known that a camera may have a pivotable or swingable lens assembly supporting member that can be moved from an operative position for exposure of a film unit to a storage position wherein a lens assembly covering door serves to protect the lens assembly when the supporting member is in this latter position. The camera of my invention is of this type and includes linkage means that is coupled to the lens assembly covering door and also coupled to the lens assembly supporting member. The provision of this linkage means and the manner in which it interrelates with the housing, the door and the lens assembly supporting member permits the camera to be either erected or folded by the same rocking movement of the door, thus quite unexpectedly overcoming the problems associated with cameras of the prior art. Additional advantages of my invention will become apparent from the detailed description of a preferred embodiment thereof.

The summary provided above describes my invention in conjunction with the structural members utilized in my preferred embodiment. Of course, if one desires, the lens assembly covering door may be omitted and a suitable structural member or lever substituted therefor for obtaining movement of the lens assembly supporting member. A modification as just described is contemplated as incorporating the broader aspect of my invention.

For a fuller understanding of the nature and object of my invention, reference should be made to the following detailed description taken in conjunction with the accompanying drawings wherein:

DESCRIPTION OF THE PREFERRED EMBODIMENT

Because photographic apparatus such as cameras for film units of the self-processing type are well known, the present description will be directed to elements forming part of or cooperating more directly with the present invention which relates to the structure for folding and erecting a camera. Apparatus and film elements not specifically shown or described herein are selectable from those known in the prior art.

With reference now to the drawings, the camera 10 of the preferred embodiment of my invention is of the folding type and includes a main film-supporting housing 12 within which suitable structure is provided to define an exposure chamber for supporting therewithin a cartridge 30 that contains a plurality of film units. The film units may be of the self-processing type and each may include processing chemicals that are released over the image forming areas of the film unit during removal of the film unit from the chamber after the film unit has been exposed. In known cartridges containing such film units the units are stacked within the cartridge with a foremost one 31 being adapted to be exposed through an aperture defined by the cartridge. Suitable transport mechanisms may be provided in the main film-supporting housing to remove an exposed film unit from the cartridge and to initiate its processing while also removing the film unit from the camera by transporting same through a film exit slot 13 formed in top wall 12a of the housing 12.

The camera further includes a lens assembly supporting board or member 40 which is connected to the housing by a hinge pin 17 so that the member is constrained for pivotal movement relative to the housing 12. The lens assembly supporting member 40 has an objective lens assembly 42 and exposure control members (not shown) mounted thereon so that, when the camera is erected, the objective lens assembly is supported with its optical axis in image focussing alignment with the focal plane of the camera. Controlled exposure of a film unit that is supported at the focal plane by suitable means may be made by movement of shutter release button 19 towards the rear of the camera to actuate the exposure control members by appropriate means not forming a part of this invention.

Figure 3:
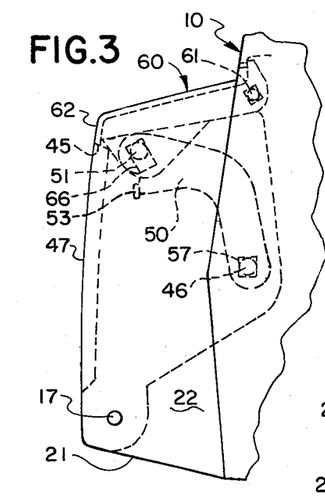
FIG. 3 is a left-side elevational view of a selected portion of the camera and shows this portion while the camera is in its folded state.

A lens assembly covering door 60 is also pivotally supported to the main housing 12 and as shown in FIG. 3 is adapted to overlie and protect the objective lens assembly when the camera is in its folded state. A link bar 50 is pivotally coupled to the door 60 and the member 40 and, in addition to its other functions which will be described, supports the camera in its erected state. The main housing 12, the member 40, the door 60 and the link bar 50 form a four-bar linkage that cooperate in a novel way to be described. Before describing the operation of the camera's erecting and folding mechanism a more detailed description of each of the four components of the mechanism will now be made.

THE MAIN FILM-SUPPORTING HOUSING

As mentioned, previously the main film supporting housing 12 encompasses the components of the camera responsible for: (1) supporting a film cartridge so that a foremost film unit therein is located at an appropriate focal plane for exposure; (2) initiating the removal of each exposed film unit in turn from the cartridge after exposure thereof; and (3) initiating the processing of the film unit while removing the film unit preferably from the camera or to some other location within the camera.

The mechanisms for performing the above operations are well known and form no part of my invention, but may comprise mechanisms similar to that used in the Kodak EK-6 and EK-8 instant cameras, manufactured respectively by Eastman Kodak Company, Rochester, N.Y. and Kodak A.G., Stuttgart, Germany.

Figure 1:
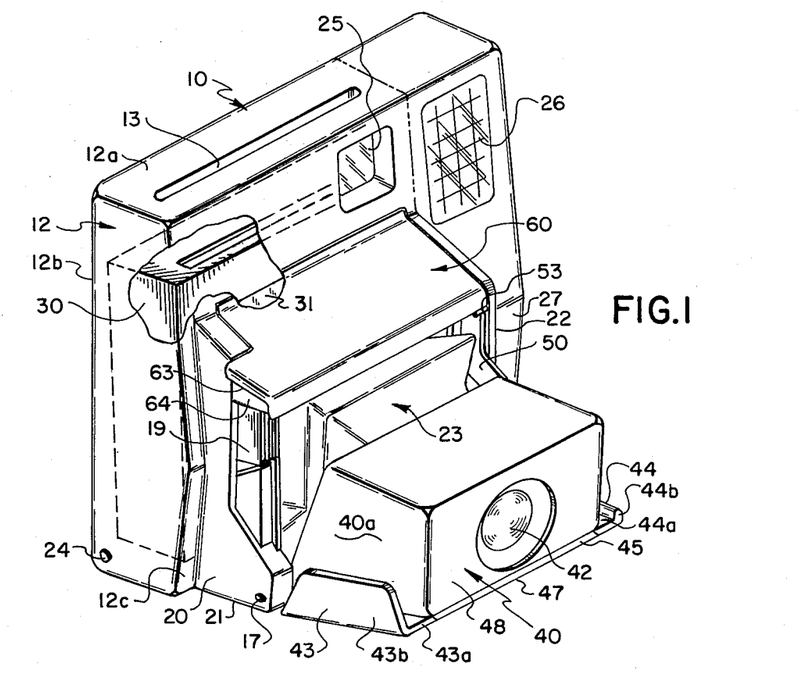
FIG. 1 is a perspective view of a camera that comprises a preferred embodiment of my invention.

The housing 12 also includes a suitable viewfinder 25, an electronic strobe flash unit 26 and a handle portion 27 immediately below the flash unit that is useful for holding the camera. The housing may also include an appropriate mechanism for blocking the viewfinder during exiting of a film unit from the camera to preclude light from entering the viewfinder and impinging upon the exiting film unit. Alternatively, the viewfinder may be located elsewhere on the camera where light passing through the viewfinder cannot reach the film unit or the film unit may be exited from another side of the camera such as the bottom side. Other modifications might include eliminating the portion of the camera (shown to the right of the dash-dotted line in FIG. 1) containing the flash unit and the handle to provide an even more compact camera.

The rear face 12b of the camera may include a cartridge loading door (not shown) that is pivotally supported by a hinge pin 24 for movement from a closed position wherein the cartridge is supported in the camera to an open position wherein the cartridge may be loaded into or removed from the camera.

Figure 2:
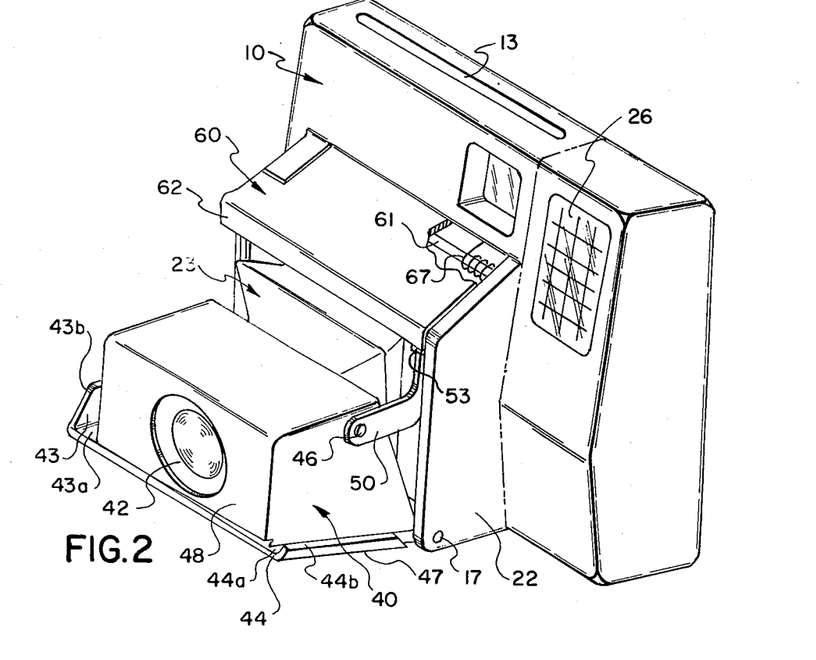
FIG. 2 is a perspective view of the camera as viewed from another vantage point.

Three rigid projections or wings extend forwardly from the front face 12c of the housing. A right wing 20 is made hollow and in this hollow the body release button 19 is located. The button 19 includes a downwardly projecting extension (not shown) that couples the button to the pin 17 to permit the button to be pivoted rearwardly when the operator wishes to initiate an exposure. A bottom wing 21 and left wing 22 (see FIG. 2) also extend from the housing. The three wings together with the lens covering door 60 cooperate to define an open-ended chamber providing therewithin an exposure passageway which forms part of the path for light or other actinic radiation from the objective lens assembly to impinge upon the film unit that is located adjacent the rearmost end of the chamber. A bellows 23 is coupled at one end of the housing 12 at a position proximate the rearmost end of the chamber and at its other end to a rear portion of the lens assembly supporting member 40 to preclude extraneous light from striking the film. When the camera is folded, this chamber in addition to enclosing the collapsed bellows also covers the front face 48 of the lens assembly supporting member and hence protects the lens assembly.

THE LENS ASSEMBLY SUPPORTING MEMBER

The lens assembly supporting member 40 comprises a hollow housing that is pivotally supported to the main housing by the pin 17. The member 40 includes a rearwardly facing opening which is covered by the forward end of the bellows 23 to define a light-tight optical path between the camera's shutter and the foremost film unit 31. In addition to having a frontwardly facing wall 48 for supporting the objective lens assembly and the camera's shutter and other exposure control elements, the member 40 also includes a bottom wall 47 for enclosing the chamber when the camera is folded. On each side of the member 40 there are formed laterally and upwardly extending wings 43, 44. Wing 43 includes a laterally extending portion 43a which extends from the housing portion of the member 40 a distance greater than the thickness of shutter release button 19 to permit the button 19 to be located between the member's right side housing wall 40a and an upwardly projecting wing portion 43b. Thus, when the camera is folded, the body release button is covered by the wing 43 and by the lens assembly covering door to preclude accidental tripping of the shutter. The left wing 44 includes a laterally extending wing portion 44a and an upwardly projecting wing portion 44b that serve, when the camera is folded, to complete the covering of the bellows enclosing chamber. As shown, in FIG. 3, a step 45 is formed between the bottom wall 47 of the board and the front wall 48 thereof to form one member of a complementary means for locking the camera in its folded state. Further description relative to this locking means will now be provided in conjunction with a description of the lens assembly covering door.

THE LENS ASSEMBLY COVERING DOOR

Figure 4:
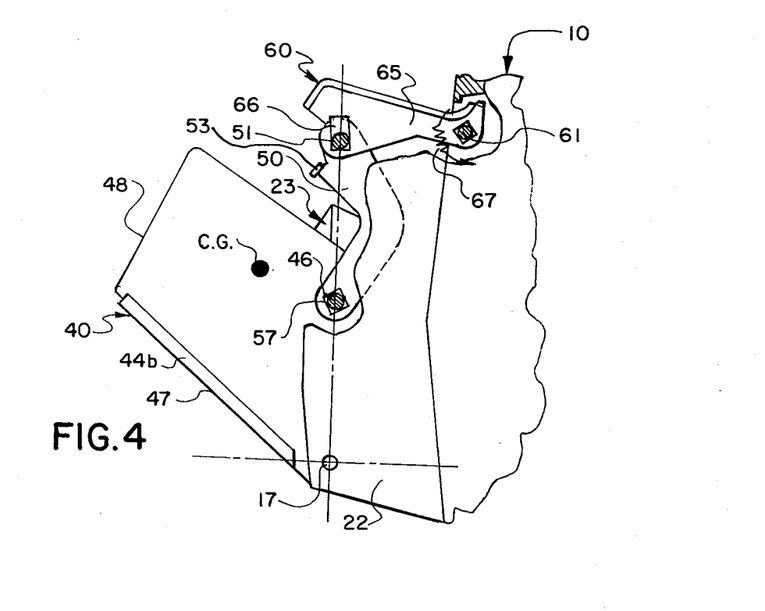
FIG. 4 is a similar view to that of FIG. 3 but shows the camera portion in an intermediate state during the erecting of the camera.

The lens assembly covering door 60 comprises a hollow structure that is affixed to the main body housing by a hinge pin 61 so as to allow pivotal movement of the door relative to the housing. The pin 61 is located adjacent a side of the exposure passageway opposite to the side to which pin 17 is located. The pin 61 is rigidly connected to the door and supported so that it may rotate relative to the housing. A torsion spring 67 is wrapped about a portion of the pin 61 and coupled to the housing so as to impart a biasing force urging the door to maintain its place in its "home" position, i.e. its lens covering position as shown in FIG. 3 or the position shown in FIG. 1 when the camera is erected. As shown in FIG. 3, when the camera is folded, the lens assembly covering door overlies the front face 48 of the lens assembly supporting member so that the latter nestles within the hollow of the former. In the folded state of the camera, a depending lip 62 at the forward end of the door is seated directly within the step 45 on the member so that the lip and step complement each other in providing a positive restraint or lock against inadvertent opening of the camera. An ear 63 extends from the right side of the door to provide, in conjunction with a wall 64 that depends from the door, a structure to which a finger of an operator may be placed to raise the door by pivoting same about pin 61. At the left side of the door, as shown in FIG. 4, another wall 65 depends from the door. Wall 65 includes a slot 66 formed adjacent the forward end of the door. The slot is of a width sufficient to accomodate a pin 51 that is located on link bar 50. The slot is preferably straight and of a length sufficient to permit limited relative translation of the pin within the slot. Since movement of the door is constrained to be only about the axis of pin 61 the slot may be modified to have slight curvature wherein the center of curvature for the slot could be the axis of pin 61.

THE LINK BAR

The link bar 50 is preferably a rigid connecting bar. It is pivotally coupled to the door by a pin 51 that is located adjacent a first end of the bar. Pin 51 is also located in slot 66 of the door. A second end of the bar is pivotally coupled to the board by a pin 46 that projects from the board and is located within a slot 57 formed on the second end of the link bar. It may be noted from FIG. 5 that when the camera is erected, a respective point on the center line of each of the pins 46, 51 and 61 lies approximately upon an imaginary straight line designated A—A'. The three respective coupling members may be said to be approximately kinematically in-line. In this regard, it is preferable to have the center of the pin 51 lie slightly below the imaginary line A—A' which is drawn through the centers of pins 46 and 61 so that, when the operator holds the camera, the door and the link bar cooperate to form a strut. Because these elements form a strut, any upward force on the lens assembly supporting member for example: from the hand of the operator, will not cause the camera to collapse to its folded state. Such force will cause the pin 51 on the link bar to bear against the lower terminus of slot 66 and tend to pivot the door about pin 61 in a counter-clockwise direction as viewed in FIG. 5. However, a clockwise torque will also be impressed upon the door by ledge 53 formed on the link bar adjacent the first end thereof which ledge bears against the lip 62. The two equal and oppositely directed torques cancel each other and result in locking of the camera in its erected state.

In FIG. 3, it may be noted that when the camera is folded the pin 51 on the link bar becomes located at the upper terminus of slot 66 of the door. Thus, when the camera is in its folded state some lost motion is provided between the door and the link bar so that no meaningful movement of the link bar occurs if the door is raised or pivoted a small amount. In order to move the link bar and thus bring about erection of the camera the door must be raised an amount sufficient to move the lower terminus of the slot 66 into engagement with the pin 51. The advantage of this is that opportunities for inadvertent erecting of the camera due to minor displacement of the door—such as might occur if the camera were to be joggled during transporting of same in a carrying case or bag—are minimized since a minimum requisite displacement of the door is necessary to effect erection of the camera.

THE BELLOWS

Figure 8:
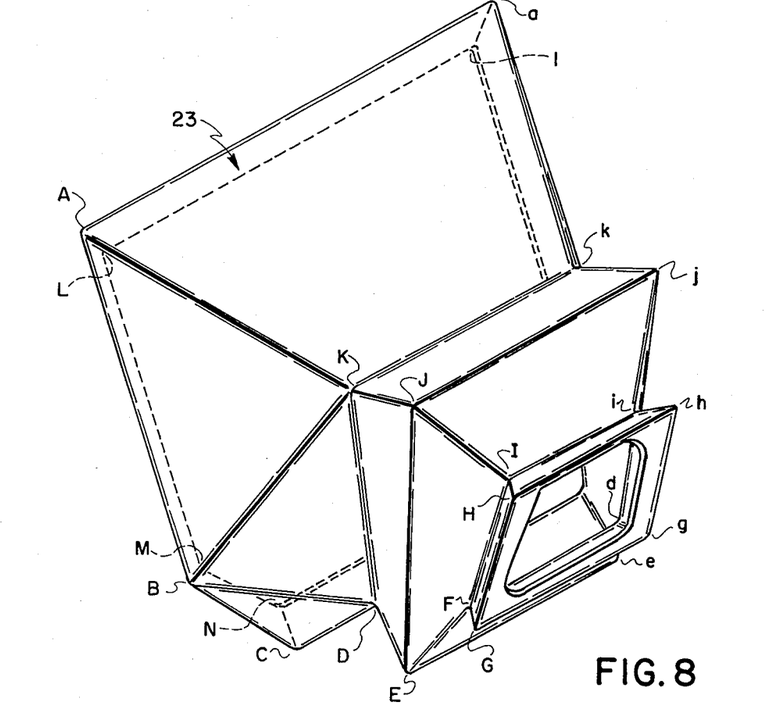
FIG. 8 is a perspective view of a bellows that is suited for use in the camera.
Figure 9:
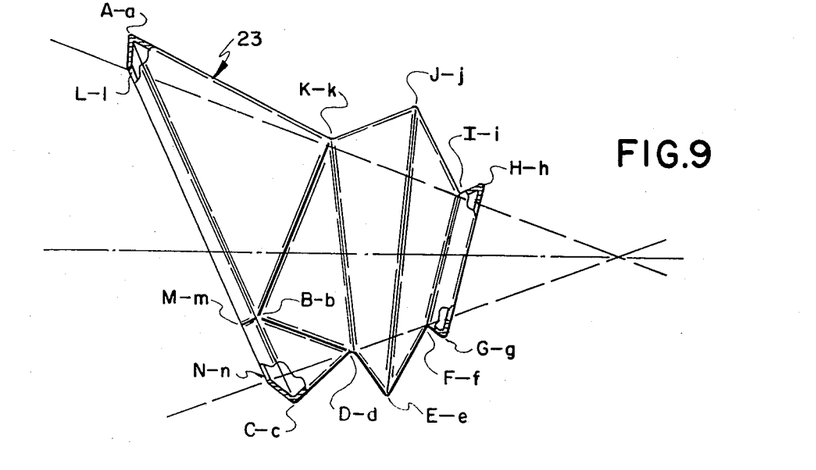
FIG. 9 is a right side elevational view of the bellows.

The bellows 23 is designed to collapse into a space defined between the rear portion of housing portion of member 40 and the forward facing portion of a film cartridge 30. A preferred embodiment of the bellows will now be described with reference to FIGS. 8 and 9. The bellows 23 is formed with a plurality of pleats for example A-a, A-K, A-B, B-b, etc. The rear portion of the bellows defined by pleats A-a, B-b, C-c, L-l, M-m and N-n is permanently constrained in the orientation shown in the drawings by suitable supporting structure in the camera housing 12. The front portion of the bellows defined by pleats H-h, h-g, G-g and G-H is coupled to the rear portion of lens assembly supporting member 40. When the member 40 is pivoted to its folded state the front portion of the bellows is constrained to follow member 40 and the bellows portions between the front and the rear portions are caused to collapse. As these bellows portions collapse the portions in FIG. 8 which face toward the front, i.e. the portion defined by surfaces A-a-k-K, A-K-B, a-k-b, B-C-D, b-c-d and C-D-d-c, and the portion defined by surfaces J-j-i-I, J-I-F-E, j-e-f-i and F-f-e-E; evert into adjacent rear facing portions to minimize the volume occupied by the bellows in the folded state of the camera.

OPERATION

Figure 5:
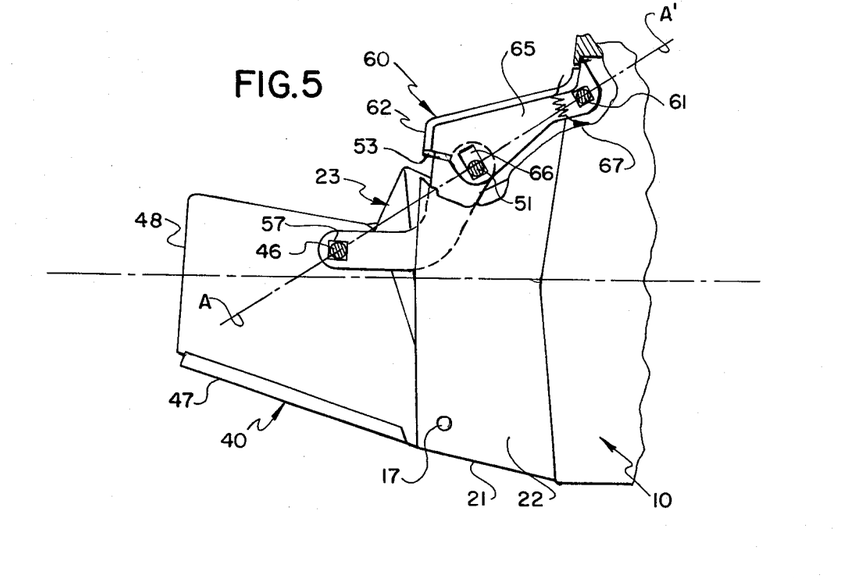
FIG. 5 is a similar view to that of FIG. 3 but shows the camera portion when the camera is fully erected.
Figure 6:
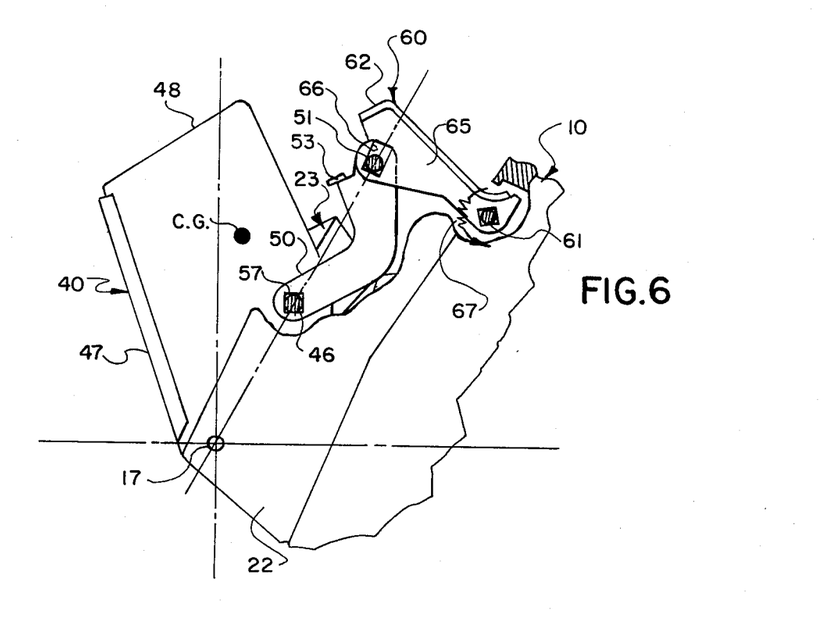
FIG. 6 is a similar view to that of FIG. 4 but shows the orientation of the portion of the camera at an intermediate stage during the folding of the camera.
Figure 7:
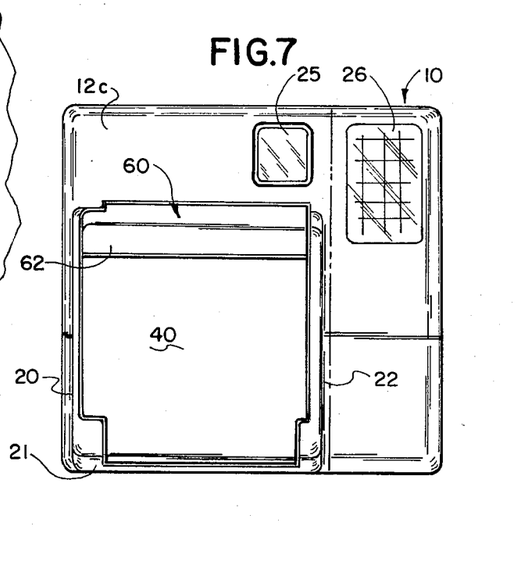
FIG. 7 is a front elevational view and shows the camera in its folded state.

In order to fold the camera from its erected state shown in FIG. 5 to that shown in FIG. 3, the operator need only place his/her finger beneath the ear 63 (FIG. 1) and raise the door from its approximately home positon shown in FIG. 5 to its temporary position shown in FIG. 6 by lifting upwardly upon ear 63 to pivot the door about the axis of pin 61. As may be noted from FIG. 6, the coupling 46, 57 between the link bar and the lens assembly supporting member forms an overcenter joint. The joint, as shown in FIG. 6, is kinematically in-line with and located between pins 17 and 51. The overcenter joint may move either to the left or right of the center or inline position shown and thereby determine whether the camera is moved respectively to its erected state or to its folded state. If the operator intends to fold the camera then he/she, simultaneously with raising of the door to its temporary position, will tilt the front of the camera to face at least partially upwardly (see FIG. 6) so that a force, such as gravity, acting equivalently through the center of gravity (C.G.) of the lens assembly supporting member is so directed relative to pivot pin 17 as to urge the overcenter joint (46, 57) to move slightly to the right of the in-line position upon initiation of movement of the door from its temporary position towards its home position. Thereafter, the operator may gradually allow the door to return to its approximate home position under the bias of torsion spring 67 whereby the return movement of the door—acting through the link bar—and gravity cooperate to force the lens assembly supporting member to move to the folded position shown in FIG. 3.

Conversely, if the operator desires to erect the camera, the camera is not tilted. The operator need only raise the door to its temporary position as shown in FIG. 4 and then allow the door to return towards its home position. When the door is raised to its temporary position the center of gravity (C.G.) of the lens assembly supporting member as shown in FIG. 4 will be so located relative to pin 17 that a force, such as gravity, will urge the overcenter joint to move slightly to the left of the in-line position upon initiation of movement of the door from its temporary position towards its home position. Therefore, when the lens assembly covering door is permitted to return to its home position under the bias of the spring 67, the return movement of the door acts through the link bar and cooperates with gravity acting on the lens assembly supporting member to continue to move the overcenter joint to the left and to cause the lens assembly supporting member to move to its erected position as shown in FIG. 5.

Thus, a folding camera has been described which may be erected or folded by the same basic rocking movement or to and fro movement of the lens assembly covering door. The operator need only orient the camera in one or the other of the orientations described above to determine whether the camera is to be erected or folded. The coupling between the door and the lens assembly supporting member assures that the objective lens assembly will be properly situated relative to a film unit when the door is returned to its home position during erection of the camera. The operator need not touch the bellows or areas of the camera near the lens so that the erecting mechanism of the camera minimizes opportunities for inadvertently touching the lens or the bellows. A further advantage of the mechanism is that relatively light-duty connecting pins may be associated with the pivot points in the mechanism since, unlike many folding cameras of the prior art, no strong springs are used which create high acceleration of parts during automatic erection of the camera. The gradual lifting and a controlled lowering of the lens assembly covering door creates relatively low acceleration on all the moving parts of this mechanism thereby allowing for less expensive supporting members. For example, during erection of the camera when the operator is lowering the lens assembly covering door, gravity tends to accelerate the lens assembly supporting member towards its erected position. The operator in this instance, however, can overcome the force of gravity on the member due to the coupling between the door and the member and can cause the member to open gradually or at a uniform rate.

The invention has been described in detail with particular reference to a preferred embodiment thereof, but it will be understood that variations and modifications can be effected within the spirit and scope of the invention.

I claim:

1. A folding camera comprising:
a housing for supporting photographic film in a focal plane;
an objective lens assembly for forming an image coincident with the focal plane;
a support member for supporting the lens assembly;
first coupling means for coupling the support member to the housing for pivotal movement of the support member to an open terminal position wherein the lens assembly is spaced from the housing in image focusing alignment with the focal plane, and to a closed terminal position wherein the camera assumes a more compact configuration with the lens assembly closer to the housing;
a lever;
second coupling means for coupling the lever to the housing for rocking movement between a home position and a temporary position;
a link bar for coupling the lever to the support member to cause the support member to pivot in response to the rocking movement of the lever;
third coupling means for pivotally coupling the link bar to the lever;
fourth coupling means for pivotally coupling the link bar to the support member and comprising an overcenter joint which is:
 (a) in a position that is approximately kinematically in-line with and located between the first and third coupling means, when the lever is raised to its temporary position, and
 (b) moveable
  (1) in one direction away from the in-line position to permit the support member to pivot to its open terminal position if at the initiation of movement of the lever from its temporary position towards its home position the support member is concurrently subjected to a force urging movement of the support member to its open terminal position, and
  (2) in a direction opposite the one direction and away from the in-line position to permit the support member to pivot to its closed terminal position if at the initiation of movement of the lever from its temporary position towards its home position the support member is concurrently subjected to a force urging movement of the support member to its closed terminal position.

2. The folding camera of claim 1, wherein the force is a gravitational force, and wherein the orientation of the camera relative to the direction of the gravitational force determines whether the support member moves to its open or closed terminal positions in response to movement of the lever from its temporary position to approximately its home position.

3. The folding camera of claims 1 or 2, wherein the lever comprises a door that is adapted to cover the lens assembly when the support member is in its closed terminal position and when the lever is in its home position.

4. The folding camera of claim 3, wherein the link bar and the lever cooperate to form a strut for supporting the support member when the camera is in its open terminal position and the lever is approximately in its home position.

5. The folding camera of claim 4, wherein the second coupling means includes a first pin; the third coupling means includes a second pin; the fourth coupling means includes a third pin; and wherein the first pin, the second pin and the third pin are approximately kinematically in-line when the support member is in its open terminal position and the lever is approximately in its home position.

6. The folding camera of claim 5, wherein the third coupling means comprises a slot formed on the lever and wherein the second pin is mounted on the link bar, the second pin being adapted to translate and pivot relative to the slot.

7. The folding camera of claims 1 or 2, wherein the link bar and the lever cooperate to form a strut for supporting the support member when the camera is in its open terminal position.

8. The folding camera of claim 7, wherein the second coupling means includes a first pin; the third coupling means includes a second pin; the fourth coupling means includes a third pin; and wherein the first pin, the second pin and the third pin are approximately kinematically in-line when the support member is in its open terminal position and the lever is approximately in its home position.

9. The folding camera of claim 8, wherein the third coupling means comprises a slot formed on the lever and wherein the second pin is mounted on the link bar, the second pin being adapted to translate and pivot relative to the slot.

10. A folding camera comprising:
a housing for supporting material to be controllably exposed to actinic radiation;
an objective lens assembly for forming an image of the radiation upon said material;
a lens assembly supporting member including a chamber-covering wall and an end wall within which the objective lens assembly is situated;
wall means extending from the housing and defining a chamber having therewithin a passageway which forms a part of the path of the radiation between the optical lens assembly and the material when the camera is in an erected state;
first hinge means pivotally supporting the member to the wall means along a first side of the passageway for permitting movement of the member to a first terminal position wherein the camera is in the erected state for controlled exposure of the material through the objective lens assembly and for movement to a second terminal position wherein the camera is in a more compact folded state with the chamber-covering wall covering the chamber;
a lens assembly covering door;
second hinge means pivotally supporting the door to the housing along a side of the passageway opposite the first side for pivotal rocking movement from a home position, wherein the door overlies the lens assembly to cover the lens assembly when the camera is in its folded state, to a temporary position, wherein the lens assembly is uncovered from the door for movement of the member towards its first terminal position, and back approximately to the home position;
a link bar for coupling the door to the support member to cause the support member to pivot in response to rocking movement of the door;
third hinge means for pivotally coupling the link bar to the door;
fourth hinge means for pivotally coupling the link bar to the member and comprising an overcenter joint which is:
(a) in a position that is approximately kinematically in-line with and between the first and third hinge means, when the door is raised to its temporary position, and
(b) moveable
(1) in one direction away from the in-line position to permit the member to pivot to its open terminal position if at the initiation of movement of the door from its temporary position towards its home position the member is concurrently subjected to a force urging movement of the member to its open terminal position, and
(2) in a direction opposite the one direction and away from the approximately in-line position to permit the member to pivot to its closed terminal position if at the initiation of movement of the door from its temporary position towards its home position the member is concurrently subjected to a force urging movement of the member to its closed terminal position.

11. The folding camera of claim 10, wherein the force is a gravitational force, and wherein the orientation of the camera relative to the direction of the gravitational force determines whether the support member moves to its open or closed terminal positions in response to movement of the door from its temporary position to approximately its home position.

12. The folding camera of claim 10 or 11, wherein the link bar and the door cooperate to form a strut for supporting the member when the camera is in its open terminal position.

13. The folding camera of claim 12, wherein the second hinge means includes a first pin; the third hinge means includes a second pin; the fourth hinge means includes a third pin; and wherein the first pin, the second pin and the third pin are approximately kinematically in-line when the support member is in its open terminal position and the door is approximately in its home position.

14. The folding camera of claim 13, wherein the third hinge means comprises a slot formed on the lever and wherein the second pin is mounted on the link bar, the second pin being adapted to translate and pivot relative to the slot.

15. The folding camera of claim 14, wherein the second pin is located at one terminus of the slot when the camera is in its folded state and as the door is initially pivoted from the home position towards the temporary position a lost motion coupling exists between the door and the link bar until the second pin engages a second terminus of the slot.

16. The folding camera of claim 15, wherein the door includes a lip that is adapted to engage the member when the camera is in its folded state to lock the camera in its folded state.

17. A folding camera comprising:
a housing for supporting photographic film for a photographic exposure;
lens supporting means hingedly supported to the housing and moveable between a storage position wherein the camera is folded and an exposure position wherein the camera is erected for making the exposure;
a cover hingedly supported to the housing for covering a portion of the lens supporting means when the latter is in its storage position and when the cover is in its home position;
linkage means cooperating with the cover for supporting the lens supporting means in the exposure position, said linkage means interconnecting the lens support means and the cover such that lifting of the cover when the lens supporting means is either in its storage position or in its exposure position moves the lens supporting means in both instances to an intermediate position where gravity in cooperation with the orientation of the camera relative to gravity determines whether the lens supporting means will be moved to its storage position or to its exposure position in response to return movement of the door towards its home position.

18. The folding camera of claim 17, wherein the linkage means is pivotally coupled to the lens supporting means and this coupling comprises an overcenter joint when the cover is raised from its home position and the supporting means is in its intermediate position.

19. The folding camera of claim 18, wherein the linkage means is coupled to the cover by a pin and slot connection wherein the slot is formed on the cover and the pin is mounted on the linkage means, the pin being adapted to pivot and translate relative to the slot.

20. The folding camera of claim 19, wherein a coupling hingedly supports the lens supporting means to the housing and wherein the overcenter joint is located between this coupling and the pin and slot connection.

21. The folding camera of claim 20, wherein the pin is located at one terminus of the slot when the camera is folded and as the cover is lifted from its home position a lost motion coupling exists between the cover and the linkage means until the pin engages a second terminus of the slot.

22. The folding camera of claim 21, wherein the cover includes a lip that is adapted to engage the lens supporting means when the camera is folded to lock the camera in this folded condition.

* * * * *